Nov. 7, 1933.  W. G. COLES  1,934,344
LUBRICATOR
Filed Feb. 16, 1932  2 Sheets-Sheet 1
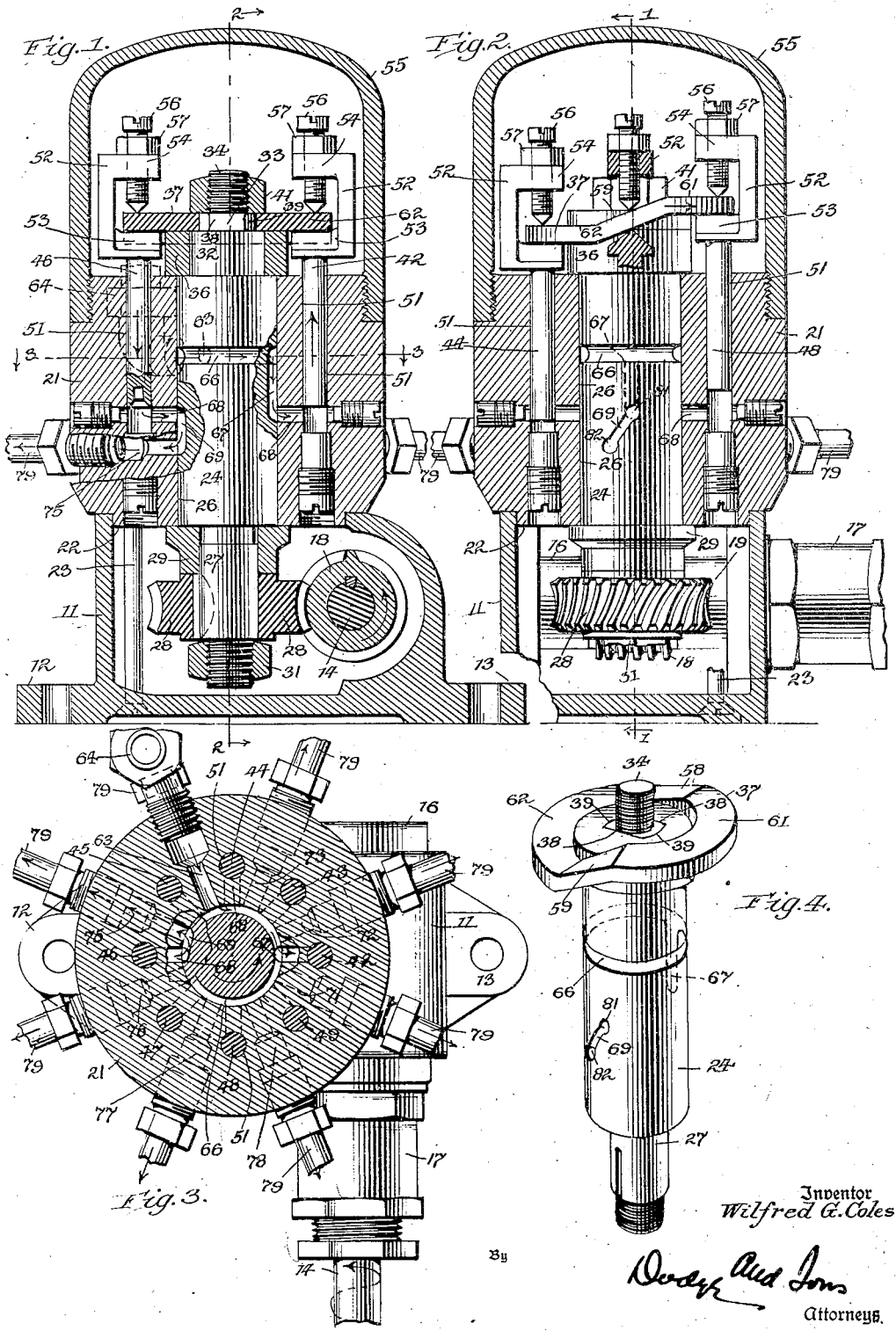
Inventor
Wilfred G. Coles
Attorneys Nov. 7, 1933.   W. G. COLES   1,934,344
LUBRICATOR
Filed Feb. 16, 1932   2 Sheets-Sheet 2
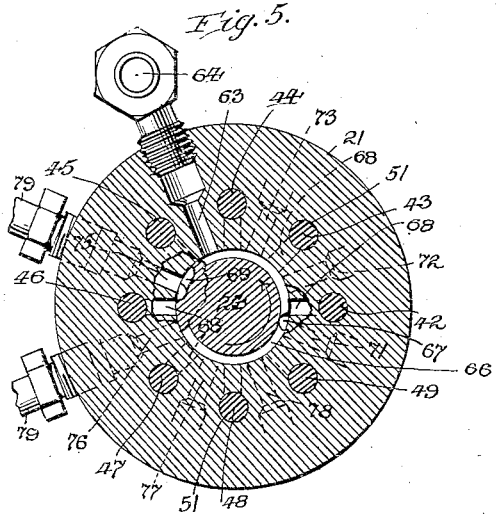
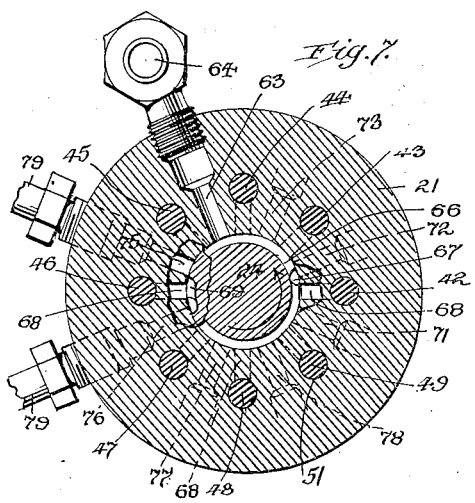
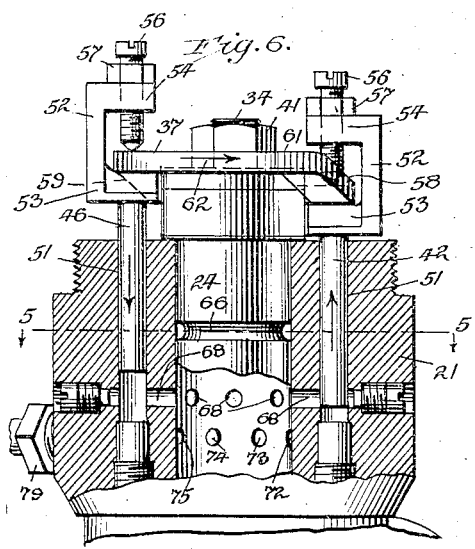
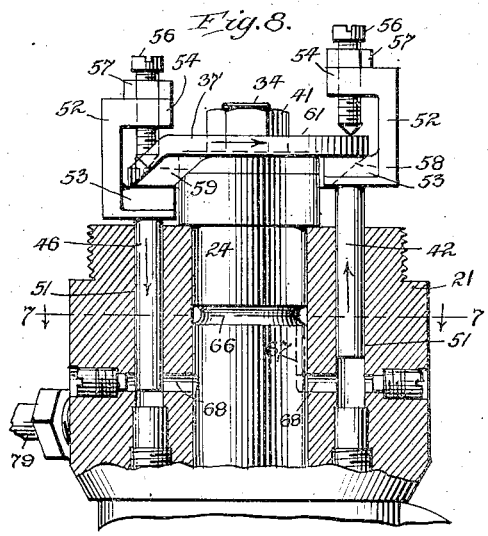
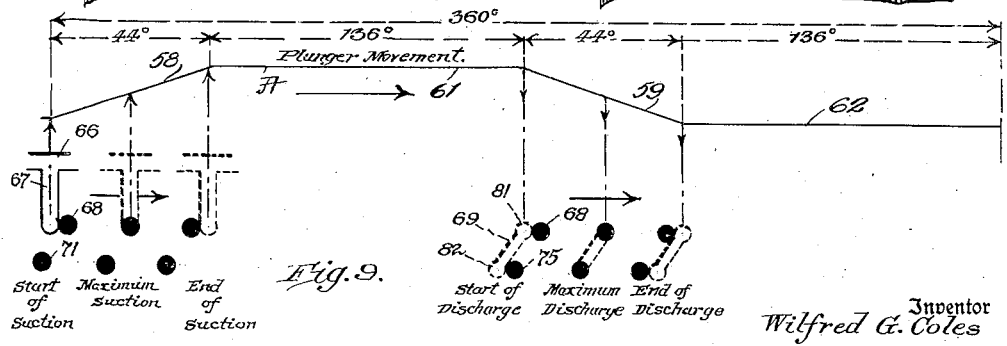
Inventor
Wilfred G. Coles
By
Attorneys Patented Nov. 7, 1933

1,934,344

UNITED STATES PATENT OFFICE 1,934,344

LUBRICATOR

Wilfred G. Coles, Madison, Wis., assignor to Madison-Kipp Corporation, Madison, Wis., a corporation of Wisconsin Application February 16, 1932
Serial No. 593,371

5 Claims. (Cl. 184—35)

This invention relates to lubricators. More particularly the invention pertains to force feed lubricators of the type wherein a rotary valve is arranged centrally of a number of lubricant pumps having plungers adapted to be actuated by means attached to the valve, distribution of the lubricant to the pumps from a source of supply and its subsequent delivery to the points of use being controlled by the movement of the rotary valve.

The primary purpose of the invention is to provide a moderate priced, but accurate and dependable, lubricator of this type; also one of simple design and compact form.

An important object also is the designing of a lubricator in which there is reduced to a minimum the possibility of leakage between passages or ports, which leakage, if present, would seriously interfere with efficient operation of the device and the delivery of accurately measured quantities of lubricant. Accurate and efficient functioning of the device is further assured by providing for interconnection and disconnection of the proper lubricant ports and passages simultaneously with the beginning and ending of the charging and discharging movements of the corresponding pump plungers.

A further feature of the device is its ability to operate efficiently for both clockwise and counter-clockwise rotation of the distributor valve.

Other objects and advantages will appear hereinafter.

In the accompanying drawings:—

Fig. 1 is a vertical sectional view of a practical embodiment of the improved lubricator, taken on line 1—1 of Fig. 2, of the eight pumping plungers only the pair of diametrically opposed plungers which are active at the time being shown for sake of clearness, the direction of movement of each plunger and of the distributing valve, and the flow of lubricant being indicated by arrows;

Fig. 2, a similar section on line 2—2 of Fig. 1, with the parts in the same position and showing clearly the relation between the active pair of plungers of Fig. 1 and the operating cam therefor, a pair of opposed inactive plungers also being shown;

Fig. 3, a horizontal section on line 3—3 of Fig. 1, showing the path of flow of lubricant from the lubricant supply connection to charge the plunger cylinder on the right, and the simultaneous discharge of lubricant from the diametrically opposed cylinder into the delivery conduit, the necessary interconnected ports and passages being in full registry at this time;

Fig. 4, a perspective of the rotor or distributor valve and attached cam, without its securing nut, removed from the lubricator to show the details thereof, including the inlet and discharge grooves in the valve;

Fig. 5, section similar to Fig. 3, taken on line 5—5 of Fig. 6 and showing the distributor valve grooves and the ports of the active pair of cylinders just beginning to lap before moving into their full registry relation of Figs. 1-3;

Fig. 6, a section similar to Fig. 1, showing the corresponding positions of the active plungers and the cam when the distributor valve is in the position of Fig. 5, the left hand plunger just beginning its downward or discharge stroke and the right hand plunger its upward or suction stroke;

Fig. 7, a section similar to Fig. 3, taken on line 7—7 of Fig. 8 and showing the distributor valve grooves and cylinder ports after they have passed beyond the full registry position of Figs. 1-3 and are just moving out of lapped relation with each other;

Fig. 8, a section similar to Fig. 1, showing the corresponding positions of the plungers and cams when the distributor valve is in the position of Fig. 7, the left hand plunger just completing its discharge stroke and the right hand plunger its charging stroke; and Fig. 9, a diagram showing the movement imparted to each succeeding pump plunger during a complete revolution of the operating cam and the relation between the plunger movement and the corresponding lubricant conducting ports and passages at the different stages of operation.

The lubricator comprises a hollow base 11 open at its upper side and provided with perforated base lugs 12, 13 for mounting purposes. A drive shaft 14 extends within the base across one side, the inner end of the shaft being journaled in a member 16 mounted in the rear wall of the base. At the front, shaft 14 projects through a stuffing box 17 mounted in the base wall. Keyed on the shaft adjacent bearing member 16 is a worm 18, while a spacing collar 19 is placed between the worm and the inner end of stuffing box 17. The outer end of shaft 14 is connected to any suitable driving means, preferably a moving part of the machine to be lubricated, whereby either continuous or intermittent rotary movement is imparted thereto.

The cylindrical body 21 of the lubricator is mounted on top of base 11. A reduced portion 22 on the lower end of body 21 fits snugly into the opening in the top of base 11 and screw bolts 23 extend through the base into body 21 to secure the members tightly together.

A rotary distributor valve 24 is mounted in a central opening 26 extending through lubricator body 21. The lower, reduced portion 27 of valve 24 projects into hollow base 11 and is threaded at its end. Removably keyed on reduced portion 27 of the valve is a worm wheel 28 meshing with worm 18 on drive shaft 14. A spacing collar 29 is located on valve portion 27 between the main body of the valve and worm wheel 28. A nut 31 holds these parts in place on the valve.

The upper end of distributor valve 24 projects above lubricator body 21 and is formed with successive reduced portions 32, 33, and 34. A collar 36 is mounted on portion 32 and, when secured in place, engages the upper face of lubricator body 21 to support the valve properly. Collar 29 at the bottom of the valve performs a similar valve positioning function in conjunction with the lower end of body 21.

A cam 37 is fixed on valve portion 33. Valve portion 33 is suitably shaped, preferably with two long sides 38 and two short sides 39, and the opening in cam 37 is similarly shaped (see Fig. 4), so that the cam will rotate with valve 24 and yet it is possible to mount the cam thereon in only two different positions. The reason for the latter will be explained later. A nut 41, on threaded portion 34, holds collar 36 and cam 37 in place on the valve.

Arranged concentrically around valve 24 and equally spaced from each other is a series of eight pump plungers 42 to 49, each arranged for vertical reciprocation in its particular cylinder 51 formed in the lubricator body 21. There may be fewer or more pump plungers, of course, depending upon the number of points to which lubricant is to be delivered.

At its upper end each of pump plungers 42 to 49 is formed with a yoke 52. Lower arm 53 of the yoke projects beneath actuating cam 37 for engagement therewith. Upper arm 54 of the yoke overhangs cam 37 and is furnished with a set screw 56, adapted to engage the upper face of the cam, and a lock nut 57, whereby adjustment may be made to vary the amount of lubricant discharged by plungers 42 to 49. A protecting hood 55 is threaded onto the upper end of body 21 to enclose the moving parts.

The annular marginal portion of cam 37 with which the plunger yokes 52 coact to operate the plungers, comprises a pair of duplicate, diametrically opposed, inclined, arcuate sections 58, 59, which are connected by an elevated horizontal arcuate section 61 and a duplicate depressed horizontal arcuate section 62. Sections 58, 59 have the same angle of inclination and are both inclined in the same direction, as shown in Fig. 4. The marginal portion of cam 37 is made of uniform thickness, so that the upper and lower faces of cam sections 58, 59 and 61, 62 are parallel to each other. The supporting web portion of cam 37 is also located equi-distant between the elevated and depressed cam portions 61, 62. Thus, there is provided a symmetrical cam which may be used to operate properly the pump plungers, irrespective of the direction of rotation of drive shaft 14, as explained later.

Connected to the outer end of an inlet passage 63 in the upper part of lubricator body 21 is a pipe line 64 extending from a suitable continuous source of lubricant supply. At its inner end, inlet passage 63 opens into an annular horizontal groove 66 formed on distributor valve 24. A second groove 67, arranged longitudinally of valve 24, opens at its upper end into annular groove 66, thereby providing for a continuous flow of lubricant to groove 67 from the source of supply.

Each of the cylinders 51 for pump plungers 42 to 49 is provided near its lower end with a combined suction and discharge port or passage 68, the inner end of which opens into distributor valve opening 26 in line with the lower closed end of groove 67. Thus, there is provided, as shown more clearly in Figs. 1, 3 and 6, a horizontal series of eight ports 68 with which the lower end of groove 67 successively moves into registry to supply lubricant thereto as distributor valve 24 is rotated.

Distributor valve 24 also is provided with an inclined groove 69 (see Figs. 2 and 4), the upper closed end of which is located diametrically opposite the lower end of vertical groove 67 and in horizontal alinement with said end of groove 67 and with cylinder ports 68. The lower closed end of inclined groove 69 is in line with the inner open ends of a horizontal series of equi-spaced discharge or delivery passages 71 to 78 formed in body 21 (see Figs. 1, 3 and 6). Thus, as valve 24 rotates, the upper end of inclined groove 69 registers successively with cylinder ports 68, while the lower end of said groove registers successively with delivery passages 71 to 78. A delivery tube 79 connected to the outer end of each passage 71 to 78 leads to a part to be lubricated.

It will be noted from Figs. 3, 5 and 7 that the series of delivery passages 71 to 78 are arranged intermediate plungers 42 to 49, and that the shape and disposition of inclined groove 69 is such that, as valve 24 rotates and inclined groove 69 registers with a cylinder port 68, said groove simultaneously connects with the corresponding delivery port 71 to 78. Since, in the arrangement shown, plungers 42 to 49 correspond, respectively, to delivery ports 71 to 78, this means that inclined groove 69 will connect, successively, cylinder 51 of plunger 42 to delivery passage 71, the cylinder of plunger 43 to delivery passage 72, and so on in the order named. The arrangement of delivery passages 71 to 78 between plungers 42 to 49 permits location of these passages at a higher level on body 21 without interfering with the plunger pumps. This materially reduces the height of the device and simplifies the construction.

In Figs. 1 to 3, for purposes of illustration, lubricant supply groove 67 is shown in full registry with port 68 corresponding to plunger 42 as a result of rotation of valve 24 in a counter-clockwise direction. It will be noted that at this time the upper end of inclined discharge groove 69 is in full registry with port 68 of cylinder 51 of the diametrically opposed plunger 46 to permit its discharge into the corresponding delivery passage 75. These positions correspond, respectively, to the "Maximum suction" and "Maximum discharge" positions indicated in the diagram of Fig. 9, explained in full later.

In Figs. 5 and 6, the parts are shown in the positions which they assume just before reaching the full registry position of Figs. 1 to 3. Here, it will be seen that supply groove 67 is just beginning to lap port 68, corresponding to plunger 42, to feed lubricant thereto from annular groove 66. Simultaneously, inclined discharge groove 69 is just beginning to lap port 68, corresponding to plunger 46, and delivery passage 75 to permit discharge of lubricant. Enlargements 81, 82, at the ends of groove 69, provide for simultaneous lapping, full registry and blanking of inclined groove 69, port 68 and delivery passage 75. The positions just mentioned correspond to the "Start of suction" and "Start of discharge" positions of the diagram of Fig. 9.

In Figs. 7 and 8, the parts are shown in the positions which they assume just after passing beyond the full registry position of Figs. 1 to 3. Supply groove 67 is just moving out of lapped relation with port 68, coresponding to plunger 42, to prevent further supply of lubricant to said port 68. Simultaneously, inclined groove 69 is just moving out of lapped relation with port 68, corresponding to plunger 46, and delivery passage 75, to prevent further delivery of lubricant. These positions correspond to the "End of suction" and "End of discharge" positions of the diagram of Fig. 9.

In describing the complete operation of the lubricator, it will be assumed that the parts are in the position of Figs. 5 and 6, with valve 24 and cam 37 rotating in a counter-clockwise direction. Cam 37 is so designed and arranged on distributor valve 24 that at this time section 58 of the cam begins to lift plunger 42 to suck a charge of lubricant into its cylinder through port 68 just as the latter begins to lap supply groove 67. Simultaneously, section 59 of cam 37 starts to depress the diametrically opposed plunger 46 to discharge the previously received charge from its cylinder through port 68, inclined groove 69 and delivery passage 75 just as the latter begin to lap. These are, respectively, the "Start of suction" and "Start of discharge" positions of Fig. 9.

At the same time, depressed portion 62 of cam 37 maintains plungers 43, 44 and 45 in their lowered position, they having previously forced the lubricant charges from their respective cylinders, while elevated cam portion 61 maintains plungers 47, 48 and 49 in their raised position, they having previously been elevated to suck charges into their cylinders.

Following this, supply groove 67 and discharge groove 69 move into the "Maximum suction" and "Maximum discharge" or full registry position with reference to the ports 68 corresponding, respectively, to plungers 42 and 46 (see Figs. 1 to 3 and 9).

Upon arriving at the position of Figs. 7 and 8, cam section 58 moves out of engagement with yoke 52 of plunger 42 to end the upward suction movement of the plunger just as supply groove 67 moves out of lapping relation with the port 68 corresponding to plunger 42. Simultaneously, section 59 of cam 37 moves out of engagement with yoke 52 of plunger 46 to end the downward discharge movement of the plunger just as discharge groove 69 moves out of lapping relation with the port 68 corresponding to plunger 46 and delivery port 75. These are, respectively, the "End of suction" and "End of discharge" positions of Fig. 9.

In other words, each of the arcuate, inclined cam portions 58, 59 is accurately designed to subtend an angle equal to the angular rotary movement of the cam and valve 24 necessary to move supply groove 67 from the "Start of suction" position to the "End of suction" position, and the discharge groove 69 from the "Start of discharge" position to the "End of discharge" position of Fig. 9.

In the particular practical embodiment illustrated, the size and arrangement of the parts is such that the charging and discharging movements of the pump plungers are made to correspond to the beginning and ending of the lapping of grooves 67 and 69 with the respective combined suction and discharge ports 68 and delivery passage 71, 75, as described, by forming cam portions 58 and 59 so that each portion subtends an angle of 44° of the 360° angular extent of cam 37. Consequently, the angle subtended by each of the equal elevated and depressed portions 61, 62 of the cam is 136°. As a result of the accurate arrangement just described, full advantage is taken of the ascending and descending movements of the diametrically opposed plungers 42, 46 to charge and discharge their respective cylinders 51. This insures the charging of the pump cylinder with an acurately measured quantity of lubricant and the subsequent delivery of the same quantity of lubricant to the point of use.

As distributor valve 24 continues its counter-clockwise rotation, the cylinders of pumping plungers 43, 44 and 45 are charged, and the cylinders of plungers 47, 48 and 49 are discharged in order, in exactly the same manner as described with reference to plungers 42 and 46. Only a pair of diametrically opposed plungers is active at a time, one plunger to charge and the other to discharge their respective cylinders, the remaining plungers being in the meantime maintained in either their elevated or depressed positions by cam portions 61, 62.

Following a 180° movement of cam 37 from the position of Fig. 6, the charge previously received in the cylinder of plunger 42 will begin discharging, while the cylinder of plunger 46, previously emptied, will simultaneously begin charging. Subsequently to the discharging and charging of these two cylinders, the cylinders of plungers 43, 44 and 45 are discharged and the cylinders of plungers 47, 48 and 49 are charged in order. The position of Figs. 5 and 6 is then resumed and the operation of the lubricator continues in the manner described.

The arrangement whereby only diametrically opposed pump plungers are active at the same is highly important in an accurate, highly efficient device of the present type. With this arrangement, ports 68 of the active pair of plungers, one of which is charging while the other is discharging, are located at diametrically opposite points on the periphery of valve 24. This reduces to a minimum the possibility of leakage between these ports, and thereby prevents any interference with the charging and discharging of accurate quantities of lubricant to and from the pump cylinders. Also, in the operation of the device, inclined groove 69 in valve 24 and the discharge passage 71 to 78 into which it is discharging are always located substantially diametrically opposite the cylinder port 68 which is receiving a charge at the time. This further guarantees that there will be no interference between the charging and discharging functions of the plunger pumps, which, if present, would render highly efficient operation of the device impossible.

While the diagram of Fig. 9 has already been referred to generally, this diagram is intended primarily to illustrate the movement which is imparted progressively to each plunger 42 to 49 in succession during one complete revolution of cam 37 and the relation of such movement to the connection and disconnection of the corresponding grooves and passages. Line A represents the plunger movement, plunger 42 being taken as an example for convenience in identifying the ports shown. The arrows indicate the direction of movement of distributor valve grooves 67 and 69 when valve 24 and cam 37 are rotating counter-clockwise, as indicated in the other figures.

Beginning at the left, the diagram shows plunger 42 located in the position of Figs. 5 and 6, and discloses the relation between groove 67 and corresponding port 68 at this time. Reading towards the right, there is shown in dotted lines the changing relation between said port 68 and groove 67, and then between the same port and groove 69 as distributor valve 24 and cam 37 revolve 360° and return to the full line position at the left of the diagram.

From the above it will be clear that a full charge is drawn successively into each of the pumps and then discharged into the corresponding delivery tube 79. As is well understood, each set screw 56 provides means for readily varying the plunger stroke and thereby regulating the amount of lubricant drawn into and then delivered by the corresponding pump. Such adjustment, however, it will be understood, does not interfere with the described simultaneous endings of the suction and discharge movements of the plunger and the disconnection of the corresponding port 68 and grooves 67 and 69.

With drive shaft 14 rotating as shown in Fig. 3, distributor valve 24 rotates counter-clockwise, thereby causing plungers 42 to 49 to eject lubricant charges in the order named. Were shaft 14 rotated in the opposite direction, and this might well be desirable or even necessary under certain conditions, the device would not function properly with cam 37 in the position shown. In other words, plungers 42 to 49 would perform their suction strokes when connected to the discharge ports 71 to 78 and their discharge strokes when connected to oil supply groove 66.

The symmetrical construction of cam 37 and the described provision for mounting it in either of two positions on valve 24 adapts the device for equally efficient operation, irrespective of the direction of rotation of drive shaft 14. When shaft 14 rotates in the opposite direction from that indicated in Fig. 3, thereby causing valve 24 to rotate in a clockwise direction, it is merely necessary to loosen nut 41, rotate cam 37 180° from the position illustrated, and secure it in place. The shape of reduced portion 33 insures proper location of the cam on valve 24. When so reversed, cam 37 causes the pump plungers 42 to 49 to eject the lubricant charges in reverse order from that indicated in the drawings, i. e., in clockwise order as the plungers appear in Fig. 3. The diagram of Fig. 9 applies to such reverse operation, except that the movement indicating arrows should be reversed and the diagram read from right to left; also, the "End of discharge" and "Start of discharge" legends should be interchanged, as should the "End of suction" and "Start of suction" legends.

The device may, of course, be combined with or placed directly on an oil reservoir, but it is primarily designed to enable the lubricator to be mounted at any desired place and the oil reservoir at another.

Various modifications are possible without departure from the invention.

What is claimed is:—

1. A force feed lubricator comprising a lubricator body having inlet and delivery passages; a plurality of lubricant pumps in said body, each of which has a chamber provided with a combined charging and discharging port adapted to communicate alternately with the inlet and delivery passages; and a rotary distributor valve in said body for operating said pumps and effecting simultaneous charging and discharging of each pair of diametrically opposed pumps in order, said valve being provided with a charging passage for conducting lubricant to said pump ports in order from the inlet passage and a diametrically disposed discharge passage for conducting lubricant from said pump ports in order directly to the respective delivery passages and to the exclusion of the pump chambers.

2. The combination in a force feed lubricator of a lubricator body having inlet and delivery passages; a pump in said body having a reciprocating plunger and a combined suction and discharge port; a rotary type distributor valve for alternately connecting said pump port to the inlet passage and the delivery passage, said valve having a longitudinal surface groove to connect the pump port and the inlet passage and a second longitudinal surface groove, spaced both longitudinally and peripherally of the valve with reference to said first-mentioned groove, to connect the pump port and the delivery passage; and a cam on said valve for operating the pump plunger.

3. In a force feed lubricator, the combination of a lubricator body having inlet and delivery passages; an annular series of lubricant pumps in said body, each of which is provided with a combined charging and discharging port, said delivery passages being staggered relatively to the pumps with each delivery passage adjacent its corresponding pump; and a central rotary distributor valve in said body for operating the pumps and for connecting each of said pump ports alternately with the inlet passage and the corresponding delivery passage, said valve having an inclined groove provided with enlarged closed ends to effect simultaneous connection of said groove with both the pump port and the corresponding delivery port.

4. In a force feed lubricator, the combination of a lubricator body having inlet and delivery passages; a pump in said body including a chamber provided with a combined charging and discharging port adapted to communicate alternately with the inlet and delivery passages; and a rotary distributor valve in said body for operating said pump, said valve being provided with a charging passage for conducting lubricant to said pump port from the inlet passage and a diametrically opposed discharge passage for conducting lubricant from said pump port directly to the delivery passage and to the exclusion of the pump chamber.

5. A force feed lubricator comprising a lubricator body having inlet and delivery passages; an annular series of lubricant pumps in said body, each of which is provided with a combined charging and discharging port adapted for connection alternately to the inlet passage and the corresponding delivery passage, said delivery passages being offset relatively to the pumps with each delivery passage adjacent its corresponding pump; and a central rotary distributor valve in said body adapted to operate said pumps and to connect each of said pump ports alternately with the inlet passage and the corresponding delivery passage, said valve having an annular groove in continuous communication with the inlet passage and a longitudinal groove leading from said annular groove to connect with the pump ports in order and an inclined groove, spaced longitudinally and peripherally from said longitudinal groove, to connect each pump port in order with its corresponding delivery passage.

WILFRED G. COLES.